(12) United States Patent
Yamazaki

(10) Patent No.: US 12,210,437 B2
(45) Date of Patent: Jan. 28, 2025

(54) INFORMATION PROCESSING APPARATUS TO DETERMINE AN EXTERNAL DEVICE WITH MAXIMUM CAPACITY AMONG A PLURALITY OF EXTERNAL DEVICES WITH STORAGE MEDIA FOR STORING LOG INFORMATION, INFORMATION PROCESSING METHOD, AND NON-TRANSITORY RECORDING MEDIUM

(71) Applicant: Tomohiro Yamazaki, Kanagawa (JP)

(72) Inventor: Tomohiro Yamazaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 17/901,867

(22) Filed: Sep. 2, 2022

(65) Prior Publication Data
US 2023/0092303 A1    Mar. 23, 2023

(30) Foreign Application Priority Data

Sep. 22, 2021    (JP) ................................. 2021-154510

(51) Int. Cl.
*G06F 11/34*    (2006.01)
*G06F 1/3206*    (2019.01)
*G06F 3/06*    (2006.01)

(52) U.S. Cl.
CPC ........ *G06F 11/3476* (2013.01); *G06F 1/3206* (2013.01); *G06F 3/0673* (2013.01)

(58) Field of Classification Search
CPC ... G06F 11/3476; G06F 1/3206; G06F 3/0673

USPC .......................................................... 714/45
See application file for complete search history.

(56) References Cited

U.S. PATENT DOCUMENTS 9,542,396 B1 *    1/2017    Pawar ................. G06F 11/1471
10,437,470 B1 *    10/2019    Zhi ......................... G06F 3/067

FOREIGN PATENT DOCUMENTS

| JP | 2009-009465 | 1/2009 |
| JP | 2017-027169 | 2/2017 |
| JP | 2019-128871 | 8/2019 |

OTHER PUBLICATIONS

Wikipedia "ACPI" page from date May 6, 2021, retrieved using the WayBackMachine, from https://web.archive.org/web/20210506093635/https://en.wikipedia.org/wiki/Advanced_Configuration_and_Power_Interface (Year: 2021).*

* cited by examiner

*Primary Examiner* — Yair Leibovich
(74) *Attorney, Agent, or Firm* — XSENSUS LLP

(57) ABSTRACT

An information processing apparatus, an information processing method, and a non-transitory recording medium. The information processing apparatus determines an external device with maximum capacity among a plurality of external devices with non-volatile storage media for storing log information, changes an amount of log information according to a capacity of the external device with the maximum capacity, and outputs the log information to the external device with the maximum capacity.

8 Claims, 5 Drawing Sheets

FIG. 4

| ID | DEVICE DRIVER | CAPACITY | DIRECT OUTPUT FUNCTION |
|---|---|---|---|
| 1 | HDD | 320GBYTE | HDD_WRITE_RAW |
| 2 | SD CARD | 256MBYTE | SD_WRITE_RAW |
| 3 | NVRAM | 512KBYTE | NVRAM_WRITE_RAW |
| 4 | RTC | 4BYTE | RTC_REG_WRITE |
| ⋮ | ⋮ | ⋮ | ⋮ |

FIG. 5

| ERROR CODE | FREQUENCY | CONFIGURATION MODULE |
|---|---|---|
| SC_XXX | HIGH | COPY APPLICATION: XXX PROCESS<br>OS: XXX DRIVER<br>⋮ |
| SC_YYY | MEDIUM | SCAN APPLICATION: YYY PROCESS<br>OS: YYY DRIVER<br>⋮ |
| SC_ZZZ | LOW | FACSIMILE APPLICATION: ZZZ PROCESS<br>OS: ZZZ DRIVER<br>⋮ |
| ⋮ | ⋮ | ⋮ |

FIG. 6

```
VOID XXX_DRIVER_WRITE () {
  :
  DGB_PRINTF (ID, 5, "THIS IS DEBUG LOG¥N");
  :
```

| ID | DEVICE DRIVER | CAPACITY | DIRECT OUTPUT FUNCTION | LOG LEVEL |
|---|---|---|---|---|
| 1 | HDD | 320GBYTE | HDD_WRITE_RAW | 5 |
| 2 | SD CARD | 256MBYTE | SD_WRITE_RAW | 4 |
| 3 | NVRAM | 512KBYTE | NVRAM_WRITE_RAW | 2 |
| 4 | RTC | 4BYTE | RTC_REG_WRITE | 1 |
| ⋮ | ⋮ | ⋮ | ⋮ | ⋮ |

INFORMATION PROCESSING APPARATUS TO DETERMINE AN EXTERNAL DEVICE WITH MAXIMUM CAPACITY AMONG A PLURALITY OF EXTERNAL DEVICES WITH STORAGE MEDIA FOR STORING LOG INFORMATION, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-154510, filed on Sep. 22, 2021, in the Japan Patent Office, the entire disclosure of which is hereby incorporated by reference herein.

BACKGROUND

Technical Field

The present disclosure relates to an information processing apparatus, an information processing method, and a non-transitory recording medium.

Related Art

In order to save space for storing log information, a technique for monitoring a value indicating usage of a device (an example of information processing apparatus) and storing the log information related to a function whose monitored value exceeds a threshold value has been disclosed. Also, a technique is developed to change the storage destination of the log information to other external device, in the case the log storage area of the external device exceeds a threshold value, by setting a log information output level and storing the log information with higher priority in the external device mainly used to output the log information.

SUMMARY

Embodiments of the present disclosure describe an information processing apparatus, an information processing method, and a non-transitory recording medium. The information processing apparatus determines an external device with maximum capacity among a plurality of external devices with non-volatile storage media for storing log information, changes an amount of log information according to a capacity of the external device with the maximum capacity, and outputs the log information to the external device with the maximum capacity.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a table illustrating an example of the log information storage process executed by the image forming apparatus according to embodiments of the present disclosure;

FIG. 5 is a table illustrating another example of the log information storage process executed by the image forming apparatus according to embodiments of the present disclosure; and FIG. 6 is a table illustrating another example of the log information storage process executed by the image forming apparatus according to embodiments of the present disclosure.

Figure 1:
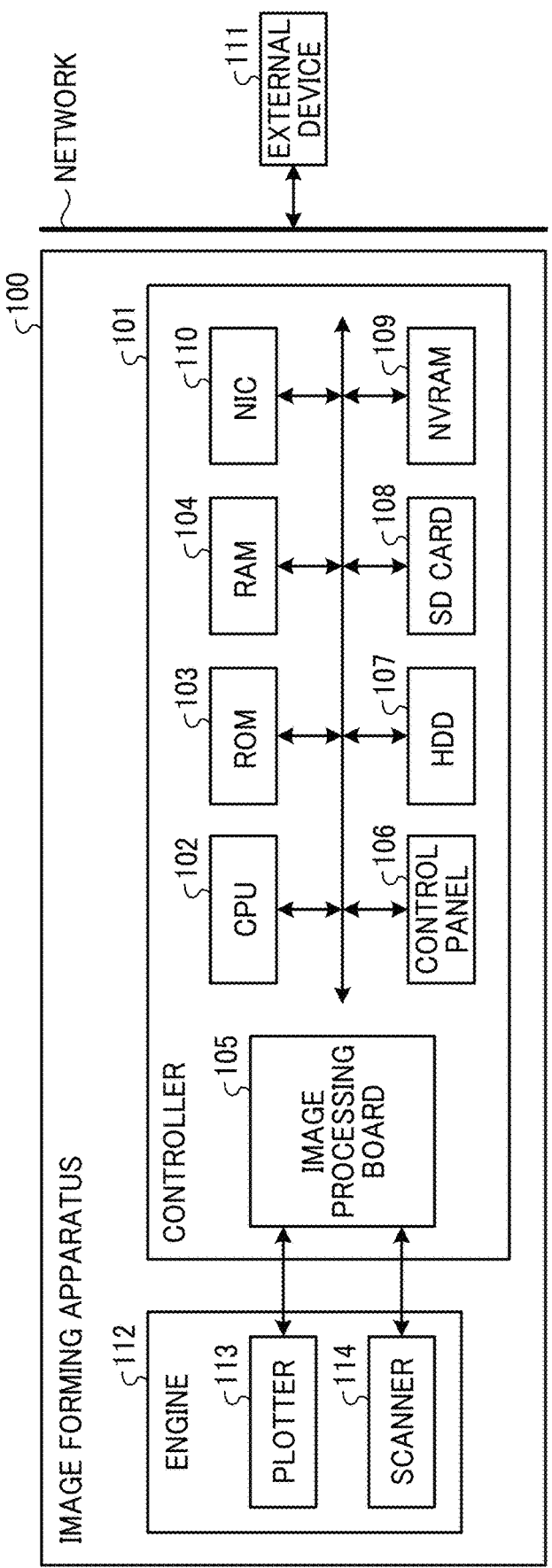
FIG. 1 is a block diagram illustrating a hardware configuration of an image forming apparatus implemented by an information processing apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, an information processing method, and a non-transitory recording medium are described in detail with reference to accompanying drawings.

FIG. 1 is a block diagram illustrating a hardware configuration of an image forming apparatus implemented by the information processing apparatus according to embodiments of the present disclosure. As illustrated in FIG. 1, the image forming apparatus 100 according to the present embodiment includes an engine 112 and a controller 101. Further, as illustrated in FIG. 1, the image forming apparatus 100 according to the present embodiment is communicably connected to an external device 111 through a network such as the internet. The external device 111 processes printing instruction and controls the image forming apparatus 100.

The controller 101 includes a central processing unit (CPU) 102, a read only memory (ROM) 103, a random access memory (RAM) 104, an image processing board 105, a control panel 106, a hard disk drive (HDD) 107, and a secure digital (SD) card 108, a non-volatile random access memory (NVRAM) 109, and a network interface card (NIC) 110.

The CPU 102 controls operation of the image forming apparatus 100 by executing an operating system (OS) and a control program. The RAM 104 is a volatile memory used as a work area of the CPU 102. The ROM 103 is a non-volatile memory in which a program executed by the CPU 102 is stored. The CPU 102 expands and executes the program stored in the ROM 103 on the RAM 104.

The control panel 106 receives operation information input by a user and displays information to the user. Further, the HDD 107, the SD card 108, and the NVRAM 109 function as external storage devices. The HDD 107 is a large-capacity storage device that stores various data such as image data, document data, various programs executed on the image forming apparatus 100, font data, system information, and user information.

The SD card 108 is used for updating the image forming apparatus 100 or the like when adding a function that the image forming apparatus 100 does not originally includes. The NVRAM 109 is a small-capacity storage device used for storing set values and the like of a device such as the image forming apparatus 100. These external storage devices are also used to store log information of the image forming apparatus 100. The NIC 110 is a network control unit that controls data communication between the image forming apparatus 100 and the external device 111 through a network.

The engine 112 includes a plotter 113 and a scanner 114. The plotter 113 prints an image from the controller 101 based on image data of image processing result. The scanner 114 is an image reading device that scans an image recorded on a storage medium such as paper and transfers the image data obtained by the scanning to the controller 101.

Figure 2:
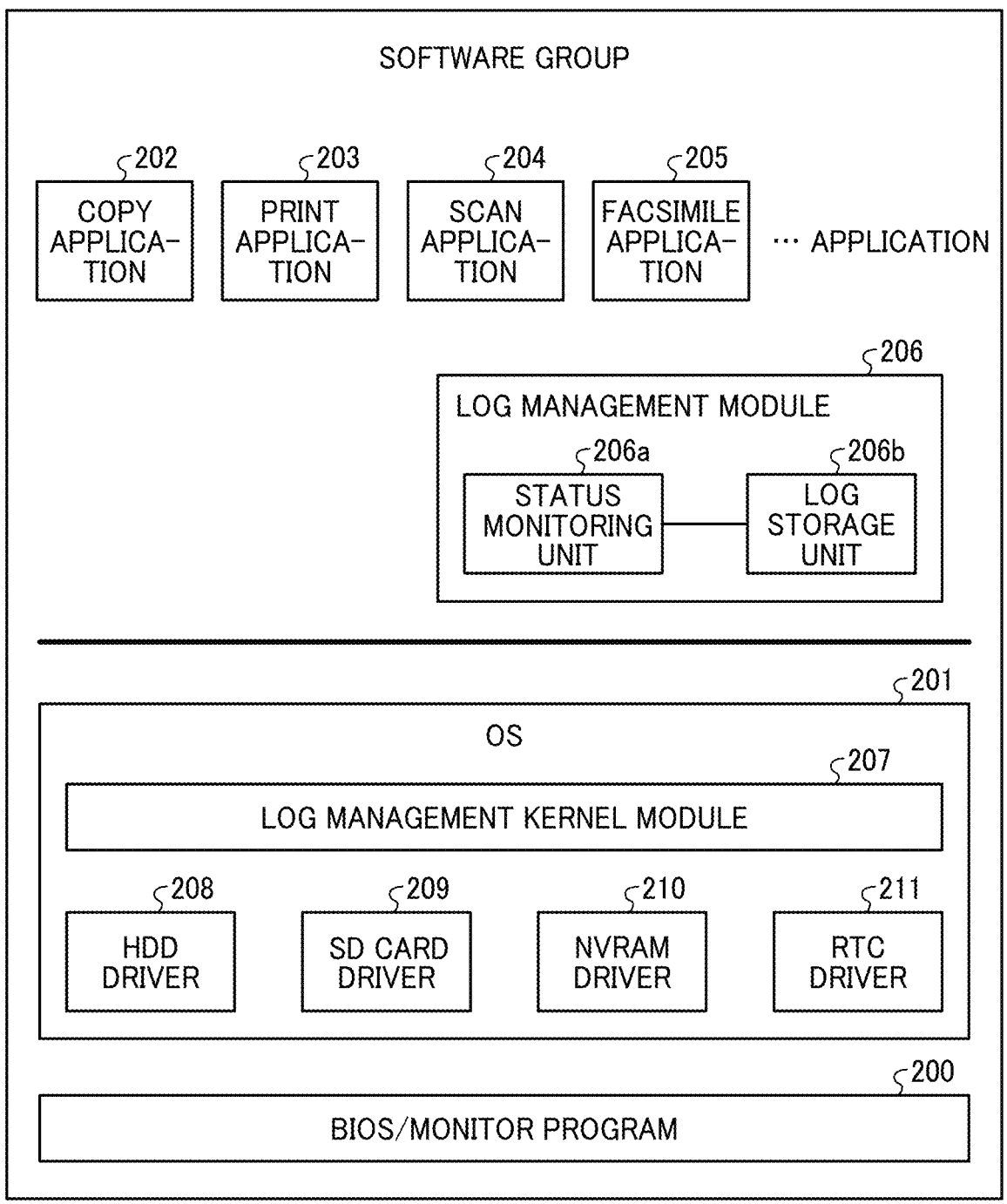
FIG. 2 is a block diagram illustrating a software configuration for controlling the image forming apparatus according to embodiments of the present disclosure.

FIG. 2 is a block diagram illustrating an example of a software configuration for controlling the image forming apparatus according to the present embodiment. The example of the software configuration for controlling the image forming apparatus 100 according to the present embodiment is described with reference to FIG. 2.

In the present embodiment, as illustrated in FIG. 2, in the image forming apparatus 100, Basic Input/Output System (BIOS) or a monitor program activates the OS 201 on the controller 101. In the present embodiment, the OS 201 includes a log management kernel module 207, an HDD driver 208, an SD card driver 209, an NVRAM driver 210, and a real time clock (RTC) driver 211. The HDD driver 208, the SD card driver 209, the NVRAM driver 210, and the RTC driver 211 are drives of non-volatile storage media (for example, HDD 107, SD card 108, NVRAM 109, RTC) that are the external devices of the image forming apparatus 100.

The image forming apparatus 100 executes copy application 202, print application 203, scanner application 204, facsimile application 205, and a log management module 206 in parallel on the OS 201. In the present embodiment, the log management module 206 includes a status monitoring unit 206a and a log storage unit 206b.

The status monitoring unit 206a identifies software and devices with frequent malfunctions among the software and devices included in the image forming apparatus 100 (an example of the information processing apparatus), based on configuration of image forming apparatus 100, a past operation history of the image forming apparatus 100, an occurrence record of malfunction, and the like. Then, the status monitoring unit 206a notifies the log storage unit 206b of information of the identified software and device (hereinafter referred to as software device information).

The log storage unit 206b calls the interface of the log management kernel module 207 to store the software device information notified from the status monitoring unit 206a and the log information stored by each module in the memory to the external device on a regular basis.

The log management kernel module 207 determines whether to output the log information to the external device based on the software device information and the log information received from the log storage unit 206b. Further, based on a determination to output the log information to the external device, the log management kernel module 207 determines the external device to output the log information.

In response to a request from the log storage unit 206b to store the log information in the external device received during operation of the image forming apparatus 100, the log management kernel module 207 identifies the external device with the maximum capacity, from among the external devices available at that time. Then, the log management kernel module 207 outputs the log information stored in the memory to the identified external device. The external device with the maximum capacity indicates the external device having the greatest capacity, from among the external devices available. Thus, the external device with the maximum capacity may not always have a capacity with its maximum level.

Specifically, the log management kernel module 207 changes the external device to output the log information and amount of the log information according to the external device with the maximum capacity among the external devices available as the output destination of the log information. Then, the log management kernel module 207 outputs the log information whose volume has been changed to the external device with the maximum capacity.

As a result, when storing the log information stored in the memory in the external device, the external device available at that time is scanned and the output destination of the log information is switched. Accordingly, even during transition to an energy saving mode of the image forming apparatus 100, immediately before turning off the power of the image forming apparatus 100, or the like, the log information to be used for failure analysis of the image forming apparatus 100 is stored. In addition, log information during the transition of the image forming apparatus 100 to the energy saving mode and immediately before turning off the power of the image forming apparatus 100 is acquired.

The log management kernel module 207 also determines whether to output the log information of the kernel inside the OS 201 to the external device. Further, the log management kernel module 207 determines whether to output the log information of the kernel to the external device, in the case the image forming apparatus 100 is in the transition to the energy saving mode or in the transition to the power off of the image forming apparatus 100. Then, the log management kernel module 207 directly outputs to the external device, the log information determined to be output to the external device.

Figure 3:
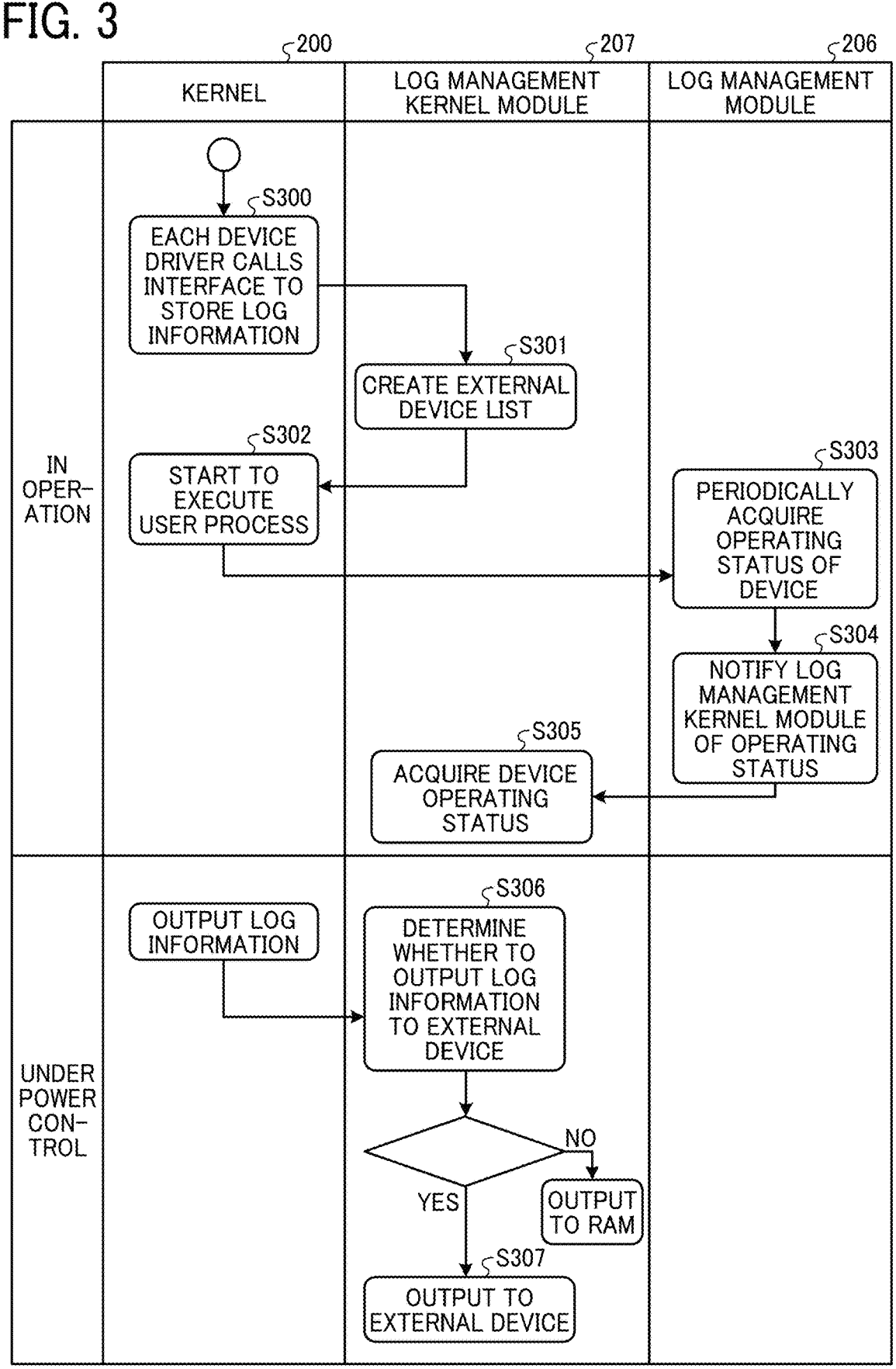
FIG. 3 is a sequence diagram illustrating an example of a log information storage process executed by the image forming apparatus according to embodiments of the present disclosure.

FIG. 3 is a sequence diagram illustrating an example of a log information storage process in the image forming apparatus according to embodiments of the present disclosure. FIGS. 4 to 6 are diagrams illustrating the example of the log information storage process in the image forming apparatus according to the present embodiment. An example of the log information storage process in the case the power of external devices is turned off in order in the process of transitioning to the energy saving mode or during the process of turning off the power of the image forming apparatus 100, is described with reference to FIGS. 3 to 6.

In step S300, in response to an activation of the kernel of the OS 201, the device driver (for example, the HDD driver 208, the SD card driver 209, the NVRAM driver 210, the RTC driver 211) included in the OS 201 calls for an interface for storing the log information from the log management kernel module 207. At that time, each device driver notifies the log management kernel module 207 of the external device information such as the capacity of the external device and a direct output function for accessing the external device.

In step S301, the log management kernel module 207 creates an external device list (see FIG. 4), which is a list for log information storage process including the capacity of the external device and the direct output function, based on the external device information notified from each device driver. In step S302, execution of each user process is started, after the kernel of OS 201 is activated.

In step S303, the status monitoring unit 206a of the log management module 206 periodically acquires the operating status of the device such as the image forming apparatus 100 (for example, device configuration information indicating the configuration of the image forming apparatus 100, operation history of the image forming apparatus 100). Then the status monitoring unit 206a identifies the software (for example, the copy application, the print application) and the external device (for example, the HDD, the SD card) used by the function in which the failure and similar errors occur based on the operation status (for example, device configuration information, operation history), and module correspondence table (see FIG. 5).

Specifically, the status monitoring unit 206a acquires error identification information from each software and external device (more specifically, from the device driver of the external device). A module correspondence table (see FIG. 5) associating a frequency of error and the configuration module that causes the error (for example, a software name indicating name of the software, a device driver name indicating name of the device driver, and the information indicating a process of the software) with each error identification information is stored in the image forming apparatus 100 in advance. The status monitoring unit 206a identifies the software that caused the error by referring to the module correspondence table. The status monitoring unit 206a creates the module correspondence table (see FIG. 5) including the frequency of error for each error identification information or the software that caused the error.

Returning to FIG. 3, the status monitoring unit 206a notifies the log storage unit 206b of the operating status such as the identified software or the external device, and the like. In step S304, the log storage unit 206b periodically notifies the log management kernel module 207 of the operating status notified from the status monitoring unit 206a. In step S305, the log management kernel module 207 acquires the operating status from the log storage unit 206b.

In response to a start of a power supply control process of the image forming apparatus 100 by the user, each device driver deletes respective external device information from the external device list (see FIG. 4) when the power supply to the external device is stopped in the power supply control process. Here, the power supply control process is a process of transitioning the power supply status of the image forming apparatus 100. In the present embodiment, the power supply control process includes a process of shifting the image forming apparatus 100 to an energy saving mode and a process of turning off the power of the image forming apparatus 100.

Specifically, each device driver notifies the log management kernel module 207 that the stop process (that is, the power supply control process) of the device driver is to be executed. The log management kernel module 207 deletes the external device information corresponding to the device driver that notified execution of the stop process from the external device list (see FIG. 4), and updates the external device list.

Returning to FIG. 3, the log management kernel module 207 determines whether power supply status of the image forming apparatus 100 is in transition, when outputting log information of software including the kernel and external devices during power supply control process. In step S306, the log management kernel module 207 determines whether to output the log information to the external device based on the software and the device notified from the log storage unit 206b. Specifically, the log management kernel module 207 determines whether the log information is output of a function in which the malfunction (error) occurs frequently, or the log information of the device driver used by the function in step S306. Based on the determination that the log information to be output to the external device is the log information of the device driver used by the function in which the malfunction frequently occurs, the log management kernel module 207 outputs the log information.

That is, the log management kernel module 207 outputs the log information to the external device based on a symptom of the malfunction during the power supply control process of the image forming apparatus 100. Accordingly, the log information can be output during the transition to the energy saving mode of the image forming apparatus 100 and in the process of turning off the power of the image forming apparatus 100. As a result, overhead of storing the log information in the external device may be prevented from increasing.

For example, the log management kernel module 207 determines whether a malfunction in access to the external device occurred while the image forming apparatus 100 is in operation. In the present embodiment, the log management kernel module 207 determines whether the device driver is included in the configuration module whose error frequency is "high" in the module correspondence table (see FIG. 5) created during the operation of the image forming apparatus 100. Then, the log management kernel module 207 outputs log information to the external device in response to an occurrence of the malfunction in access to the external device. As a result, the log information is kept when there is a high possibility that the malfunction in the power supply control process occurs due to the malfunction in access to the external device.

Further, for example, the log management kernel module 207 determines whether software errors occur frequently. In the present embodiment, the log management kernel module 207 determines whether the software is included in the configuration module whose error frequency is "high" in the module correspondence table (see FIG. 5) created during the operation of the image forming apparatus 100. That is, the log management kernel module 207 outputs the log information to the external device when the number of occurrences of software errors in the image forming apparatus 100 exceeds a threshold value. Accordingly, the log information is kept in the case there is a high possibility that the malfunction occurs during the power supply control process of the image forming apparatus 100.

Further, for example, the log management kernel module 207 determines whether the output is the log information of the device driver used by the function in which the error occurs frequently. In the present embodiment, the log management kernel module 207 determines whether the output is the log information of the "xxx driver" assuming the "xxx driver", which is the device driver that is the configuration module whose frequency of error is "high", is the output target. That is, the log management kernel module 207 outputs the log information of the device driver that uses the function of the image forming apparatus 100 in which the number of errors is equal to or greater than the threshold value to the external device. As a result, in the case storing all the log information is not possible due to the capacity of the external device, the log information with higher priority is stored selectively.

Returning to FIG. 3, in step S307, the log management kernel module 207 determines the external device to which the log information is to be output based on the external device list (see FIG. 4), and directly output the log information to the device. External device information is deleted from the external device list illustrated in FIG. 4 as the power supply control process progresses. Accordingly, the log management kernel module 207 determines the external device to output the log information from running device drivers in the updated external device list (see FIG. 4). In the present embodiment, the log management kernel module 207 refers to the external device list illustrated in FIG. 4 and determines the external device having the largest capacity among the operating external devices as the external device to output the log information. As a result, even in the case the power state of the external device is in transition, the log information of the function with the malfunction is output to the external device, so that the time until the defect of the function is resolved can be shortened.

In the present embodiment, the frequency of error is categorized into three steps, but in the case the frequency of error is high for many functions, the image forming apparatus 100 may not operate normally when all the log information is to be output. The log management kernel module 207 sets a log level in the direct output function in the kernel as illustrated in FIG. 6. The log level may be changed depending on the external device of the log information output destination. In the case the log level (output level) is set in the log information in the kernel of OS 201 of the image forming apparatus 100, the log management kernel module switches the log information to be output according to the output destination external device. Accordingly, volume of the log information output to the external device is limited to minimum. Here, the log level is the importance of log information.

Specifically, a log level column is added to the external device list illustrated in FIG. 4, and the output of log information inside the kernel is unified to the DBG_LINKF macro in advance. A first argument indicates an identifier (ID) of a current output destination device. The first argument is updated when the external device whose power is turned off is deleted and the ID of the external device having the maximum capacity is set as a global variable. A second argument indicates the log level, and the smaller the value, the heavier the log information. When outputting the log information in step S307, the log management kernel module 207 compares the log level set in the second argument of DRPRINTF with the log level of the line indicated by the ID of the first argument. The log management kernel module 207 outputs the log information to the external device using the direct output function as an output target in the case the log level of the line indicated by the ID of the first argument of DRPRINTF is the same as or greater than the log level set in the second argument of DRPRINTF.

For example, the log management kernel module 207 outputs the log information to the HDD in the case the HDD is available in the external device list illustrated in FIG. 6, and in the case the HDD is turned off, the log information is not output to the HDD. That is, the log level that is output in the case there is a margin in the capacity indicates a log level that is not high. As a result, in the case storing all the log information is not possible due to the capacity of the external device, the log information is stored selectively.

As described above, according to the image forming apparatus 100 of the present embodiment, the output destination of the log information with higher priority is switched by scanning the external device available at that time, when storing the log information stored in the memory to the external device. Accordingly, even during transition to an energy saving mode of the image forming apparatus 100, immediately before turning off the power of the image forming apparatus 100, or the like, the log information to be used for failure analysis of the image forming apparatus 100 is stored.

The information processing apparatus is not limited to the image forming apparatus 100 as long as the apparatus includes a communication function. The information processing apparatus includes, for example, an output device such as a projector (PJ), an interactive white board (IWB: a white board having an electronic whiteboard function capable of mutual communication), a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC, and a desktop PC.

The program executed by the image forming apparatus 100 of the present embodiment is provided by being incorporated in the ROM 103 or the like in advance. The program executed by the image forming apparatus 100 according to the present embodiment may be stored in a computer readable storage medium, such as a compact disc read only memory (CD-ROM), a flexible disk (FD), a compact disc recordable (CD-R), and a digital versatile disk (DVD), in an installable or executable file format for distribution.

Further, the program executed by the image forming apparatus 100 of the present embodiment may be stored on a computer connected to a network such as the internet and provided by downloading through the network. Further, the program executed by the image forming apparatus 100 of the present embodiment may be configured to be provided or distributed through a network such as the internet.

The program executed by the image forming apparatus 100 of the present embodiment has a module configuration including the above-mentioned parts (log management module 206, status monitoring unit 206a, log management kernel module 207). As actual hardware, a processor such as the CPU 102 reads the program from the ROM 103 and executes the program, so that each part is loaded on the main storage device and the log management module 206, the status monitoring unit 206a, and the log management kernel module 207 are implemented on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
   circuitry configured to:
   create an external device list including at least one of a plurality of external devices having log information as an output;
   receive a request for transitioning states of the plurality of external devices with non-volatile storage media and the information processing apparatus to states where powers of the plurality of external devices and the information processing apparatus are turned off or set to energy saving modes;
   determine a first external device among the plurality of external devices, to which supply of power is to be stopped based on the request;
   delete the first external device from the external device list;
   determine a second external device with maximum capacity from the external device list excluding the first external device; and
   output the log information to the second external device.

2. The information processing apparatus of claim 1, wherein
   the circuitry is further configured to, based on a symptom of a malfunction during a power supply control process of the information processing apparatus, output the log information to the second external device.

3. The information processing apparatus of claim 1, wherein
   the circuitry is further configured to, based on a malfunction in access to the first external device during operation of the information processing apparatus, output the log information to the second external device.

4. The information processing apparatus of claim 1, wherein
   the circuitry is further configured to, in a case a number of software errors in the information processing apparatus exceeds a threshold value, output the log information to the second external device.

5. The information processing apparatus of claim 1, wherein
   the circuitry is further configured to output, to the second external device, the log information of a device driver that uses a function in which number of errors exceeds a threshold value among functions of the information processing apparatus.

6. The information processing apparatus of claim 1, wherein
   the circuitry is further configured to, in a case an output level is set in the log information in a kernel of an operating system (OS) of the information processing apparatus, switch the log information to be output according to the second external device to which the log information is output.

7. An information processing method executed by an information processing apparatus, the method comprising:
   creating an external device list including at least one of a plurality of external devices having log information as an output;
   receiving a request for transitioning states of the plurality of external devices with non-volatile storage media and the information processing apparatus to states where powers of the plurality of external devices and the information processing apparatus are turned off or set to energy saving modes;
   determining a first external device among the plurality of external devices, to which supply of power is to be stopped based on the request;
   deleting the first external device from the external device list;
   determining a second external device with maximum capacity from the external device list excluding the first external device; and
   outputting the log information to the second external device.

8. A non-transitory recording medium storing a plurality of instructions which, when executed by one or more processors, causes the one or more processors to perform an information processing method comprising:
   creating an external device list including at least one of a plurality of external devices having log information as an output;
   receiving a request for transitioning states of the plurality of external devices with non-volatile storage media and an information processing apparatus to states where powers of the plurality of external devices and the information processing apparatus are turned off or set to energy saving modes;
   determining a first external device among the plurality of external devices, to which supply of power is to be stopped based on the request;
   deleting the first external device from the external device list;
   determining a second external device with maximum capacity from the external device list excluding the first external device; and
   outputting the log information to the second external device.

* * * * *